3,485,085
LEAK DETECTOR
William M. Hawkins, Jr., 9414 Thrush Lane,
Potomac, Md. 20854
Filed Apr. 23, 1968, Ser. No. 723,504
Int. Cl. G01m 3/08
U.S. Cl. 73—46        3 Claims

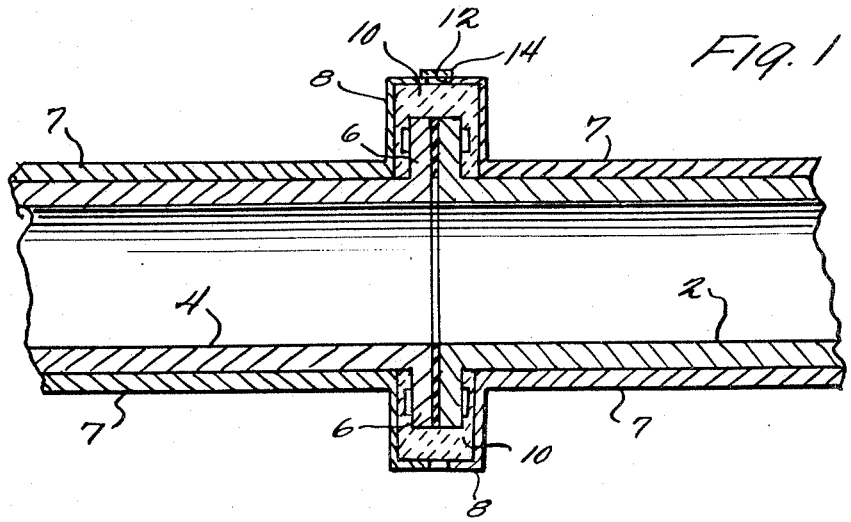
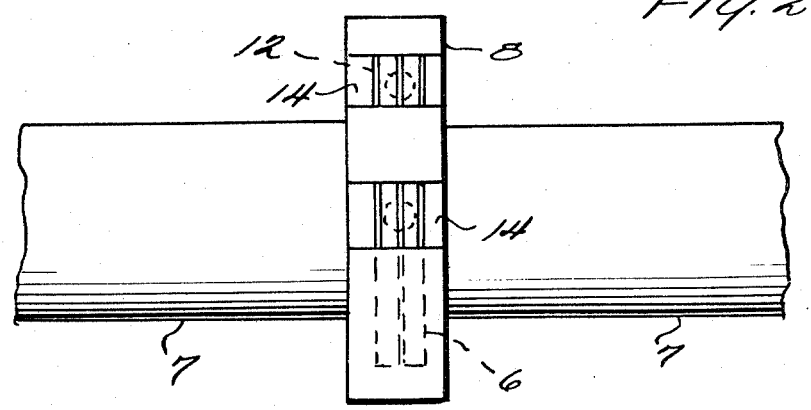
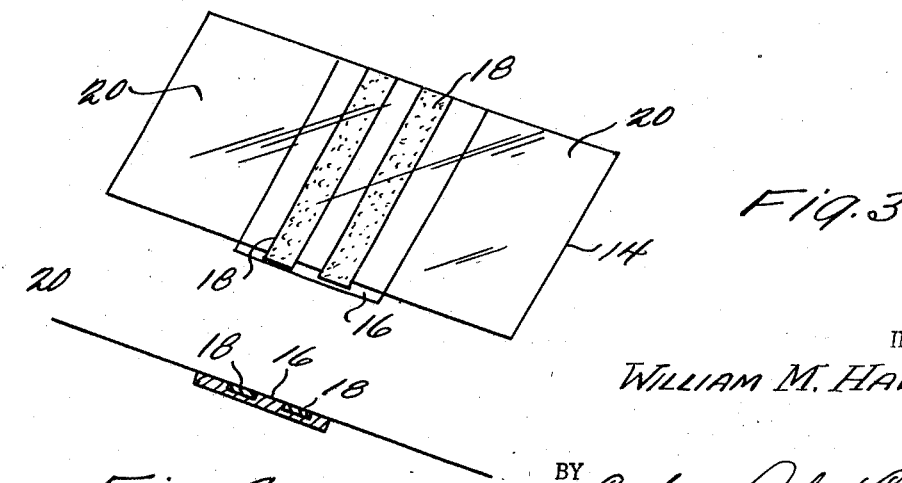

ABSTRACT OF THE DISCLOSURE

A system is provided for the detection of leaks in the cooling system of a power reactor wherein the coolant is water at a temperature above the boiling point of water at atmospheric pressure. A container having an aperture is placed over the reactor at the suspected point of leakage. The container is filled with sufficient insulating material to reduce the temperature of the container surfaces to the condensation temperature of water at atmospheric temperature. A moisture sensitive tape which undergoes a change in resistivity upon contact with moisture is placed over the aperture in the container. If a leak occurs in the reactor, moisture will reach the tape and the tape will indicate the presence of the leak.

---

The present invention is concerned with leak detection, particularly in connection with the cooling systems of power reactors.

The early detection of leaks in the primary coolant systems of atomic power reactors is of utmost importance in order to protect against the more serious difficulties which occur if such leaks go unnoticed until a relatively late stage. Accordingly, considerable attention has been directed towards developing reliable techniques and systems for detecting leaks at an early stage but, while this has resulted in some systems of limited usefulness, there is still a real need for further improvement in this area. One method which has previously been proposed for use on research and test reactors involves using a chemically impregnated tape which changes color and electrical resistivity when exposed to water. The tape is wrapped about the joint or valve to be checked for leakage and, if a leak develops, the color and resistivity of the tape change. This technique has been effectively used in connection with leak detection in research and test reactors. However, in this case, the temperatures to which the tape is exposed are lower than the condensing temperature of steam at atmospheric pressure and the tape can be effectively used at this temperature. Unfortunately, however, the temperatures prevailing in most areas of the primary cooling system of power reactors are upwards of 500° F. and, in any case, greatly exceed the point where the tape is destroyed.

In view of the above, it has not been possible to use a tape of the type indicated for detecting leaks in the primary cooling system of power reactors. Instead, since there is some radioactivity in the primary system circulating fluid, a monitor of radioactivity is employed to pick up radioactivity in the general area. However, if the leak is small and increases slowly, it might well go unnoticed for a relatively long time even with the monitor. Furthermore, even when there is an awareness of a leak somewhere, the monitoring devices give no positive indication of the exact location of the leak and, in order to find the leak so as to repair it, it is necessary to embark on the laborious, time-consuming and expensive operation of manually checking all joints by an ultrasonic device or a sensitive radioactivity detector. This may also involve rather large-scale dismantling of the system in the general area of the leak when it is not possible to definitely locate the exact spot where leakage is occurring.

The principal object of the present invention is to provide a method and means for detection of leaks in the primary cooling system of atomic power reactors whereby prior problems of the type indicated above are obviated and leaks are effectively and conveniently determined with a minimum of effort. Other objects will also be apparent from the detailed description of the invention which follows.

Broadly stated, the invention contemplates means for continuously monitoring the entire primary cooling system and provides an audible and/or visual signal whenever a small leak occurs anywhere in the system. With an early awareness of a potential leakage problem, it then becomes possible to plan an orderly repair program and reduce any hazards or inconvenience caused by the presence of the leak. Moreover, with the invention, it is possible to localize the leak so as to reduce the time and effort necessary to trace it. The net result is a reduction in the cost of operation and maintenance and an increase in the plant load factor.

The invention is illustratrated by the accompanying drawings wherein:

FIGURE 1 is a vertical sectional view showing use of one form of monitoring means of the invention at a joint in a conventional cooling system or the equivalent;

FIGURE 2 is a plan view of the embodiment shown in FIGURE 1;

FIGURE 3 is a perspective view of a detecting tape as used herein; and

FIGURE 4 is a vertical sectional view through the tape of FIGURE 3.

Referring more specifically to the drawings, FIGURES 1 and 2 show conventional pipe members 2 and 4 with joint 6 in a primary cooling system or the like, i.e. a heavy or light water cooling system. The pipe members 2 and 4 will usually be insulated as shown at 7 although this itself forms no part of the present invention.

According to the invention, the joint 6 may be surrounded by a thin-walled, essentially liquid- and vapor-impervious container 8 which fits tightly around the joint. Advantageously, the container is made of metal or other material which is not adversely affected by the temperature to which it is exposed. The container need not be completely hermetically sealed against the pipe surface. However, it should fit sufficiently close to the pipe surface as to substantially restrict the free passage of air or gas into or out of the container along the pipe surface. The container walls may be quite thin since they are not intended to withstand any pressure differential.

The inner walls of the container are spaced somewhat from the joint to provide an area which is filled with porous insulating material 10, e.g. fiber glass or the like. The insulating material should be of such thickness and so disposed that the temperature of the surfaces of the container will be reduced to some value lower than 212° F., it being noted that under steady state conditions, a balance is reached between the heat conducted through the insulation and the heat radiated and convected to the air surrounding the container.

The container is provided with one or more holes 12 which provide communication between the insulating material 10 within the container and the exterior thereof. Advantageously, the container is provided with several such holes 12 spaced around the surface of the container. Two such holes are shown in FIGURE 2 although it will be recognized that the number and spacing of these may be varied. It will be appreciated that the shape of the container or casing 8 may be varied (for example, it may be cylindrical or cubical) and the number and location of the holes 12 therein will depend at least to some extent on the shape involved.

The holes in the container or casing 8 are covered over with leak detecting tape 14 as shown in FIGURE 1 and FIGURE 2. The tape itself is of known construction but, for convenience, it is illustrated in perspective in FIGURE 3 and in vertical section in FIGURE 4. As shown, the tape consists of a base matrix 16 of chemically treated paper or fibers over which there are placed several electrical conductors 18, usually copper strips, which are spaced laterally across the width of the matrix and extend longitudinally thereof. The tape is completed by means of a transparent adhesive polyester film backing member 20. In use, the tape is adhered to the container to cover the holes therein with chemically treated matrix 16 facing downwardly so as to be open to communication with the interior of container 8. The sides and ends of the polyester backing 20 surrounding the paper should be firmly adhered to the container to prevent moisture from the outside seeping into contact with matrix 16. The ends of the copper conductors are electrically joined in any convenient fashion (not shown) across appropriate measuring means, e.g. a vacuum tube voltmeter to record changes in the resistivity of the matrix 16. As long as the fibers of the matrix remain dry, the matrix maintains its original color, e.g. a light straw color, and the electrical resistance is of the order of, for example 1–10 megohms across two conductors. However, if the tape contacts water by virtue of a leak at the joint with consequential condensation of moisture within the container, the matrix fibers turn blue and the electrical resistance thereof decreases by a factor of approximately 1000. The monitoring device is advantageously positioned at a remotely located control panel to provide continuous readings as to the conductivity of the tape. If desired, means may be provided for giving a visual or audible alarm or like indication when the resistivity of the tape changes to reflect moisture leakage at the joint.

It will be appreciated that as many individual connections can be made as desired, so that each joint or valve in a cooling system may have its own signal indication. If this results in an excessive number of annunciator locations, a number of locations may be wired together in groups. Then, when a signal is picked up, it is a simple matter to investigate the affected area until the location of the leak is detected by means of the change in color of the tape.

As will be apparent from the above, the leak detecting tape which is disposed over the holes in the container is activated so as to put into effect some sort of visual or audible signal by moisture which leaks out from the joint or valve being monitored and condenses and collects inside the container. This moisture reaches the leak detecting tape by capillary action through the porous insulation and/or by gravity depending on the positioning of the holes in the container. The tape represents a highly convenient form of leak detecting means but it will be recognized that alternatives for detecting the presence of moisture within the space surrounding the joint or valve being monitored may also be used.

Although the invention is illustrated by specific reference to joints, either welded or bolted, in the cooling system as potential sources of leakage, the invention is equally applicable to monitor any piece of pipe or vessel in the system. The leak detecting means may be placed at a suitable location or in a continuous run longitudinally disposed on the outside surface of the porous insulation and the surface of the insulation then may be covered with a container as described. In lieu of the container, there may be used some other essentially moisture proof barrier, e.g. a coating or wrapping material placed over the insulation. As will be appreciated, long runs of piping may have moisture barriers introduced at intervals along the length so as to prevent migration of moisture and thus localize the leakage indication.

In summary, essential elements of the present invention comprise the container or other moisture barrier means surrounding a joint, valve or other point to be monitored, the porous insulating material which fills the space between the monitored point and the moisture barrier means so as to keep the surface of the container at a temperature below the condensation point of water at atmospheric pressure and means for detecting the presence of condensed moisture within the container. Advantatges of this system include the possibility of continuous monitoring from a central location and immediate identification of the location of leaks. Additionally, if there should be a failure in the cladding of a fuel element, any leakage or fission products through an imperfect joint in the primary cooling system will be trapped inside the leak detector containers, thus reducing the hazard to personnel and simplifying clean-up procedures. Other advantages will also be apparent to those skilled in the art.

Various modifications may be made in the invention described herein without deviating from the scope thereof.

I claim:

1. A method for detecting leaks in the cooling system of a power reactor wherein the circulating water coolant is at a temperature above the normal boiling point of water at atmospheric pressure, which comprises positioning an apertured container or other moisture barrier around the point where leakage may occur, filling the space between said barrier and said point with enough porous insulating material sufficient to reduce the temperature of the surfaces of said container or casing to the condensation temperature of water at atmospheric pressure, positioning moisture detecting means over an aperture in said barrier and continuously monitoring said moisture detecting means.

2. The method of claim 1 wherein said moisture detecting means comprise a tape whose resistivity changes on exposure to moisture and the monitoring for leaks includes continuously measuring the resistivity of said tape.

3. In combination with the cooling system of a power reactor wherein the coolant water has a temperature above the normal boiling point of water at atmospheric pressure, a system for detecting leaks at joints or other points where leakage may develop in said cooling system, said system for detecting leaks including a container or other moisture barrier having at least one aperture therein surrounding the joint or other point to be checked for leaks, insulating material within said barrier so as to lower the temperature of the said barrier to below the condensation temperature of water at atmospheric pressure, the aperture in said barrier communicating with the interior thereof and the insulating material therein, moisture detecting means positioned over said aperture, said leak moisture detecting means being subject to a change in resistivity when contacted with water within said barrier and means for monitoring said moisture detecting means to determine changes in the resistivity thereof.

References Cited

UNITED STATES PATENTS 1,546,033  7/1925  Sharp.
2,691,134  10/1954  Ford _____ 73—40 X LOUIS R. PRINCE, Primary Examiner J. NOLTON, Assistant Examiner U.S. Cl. X.R.

73—40.5; 324—65